Feb. 23, 1960     R. L. JAESCHKE     2,925,896
HARDENED SURFACES FOR MAGNETIC FLUID CLUTCHES
Filed Nov. 8, 1954
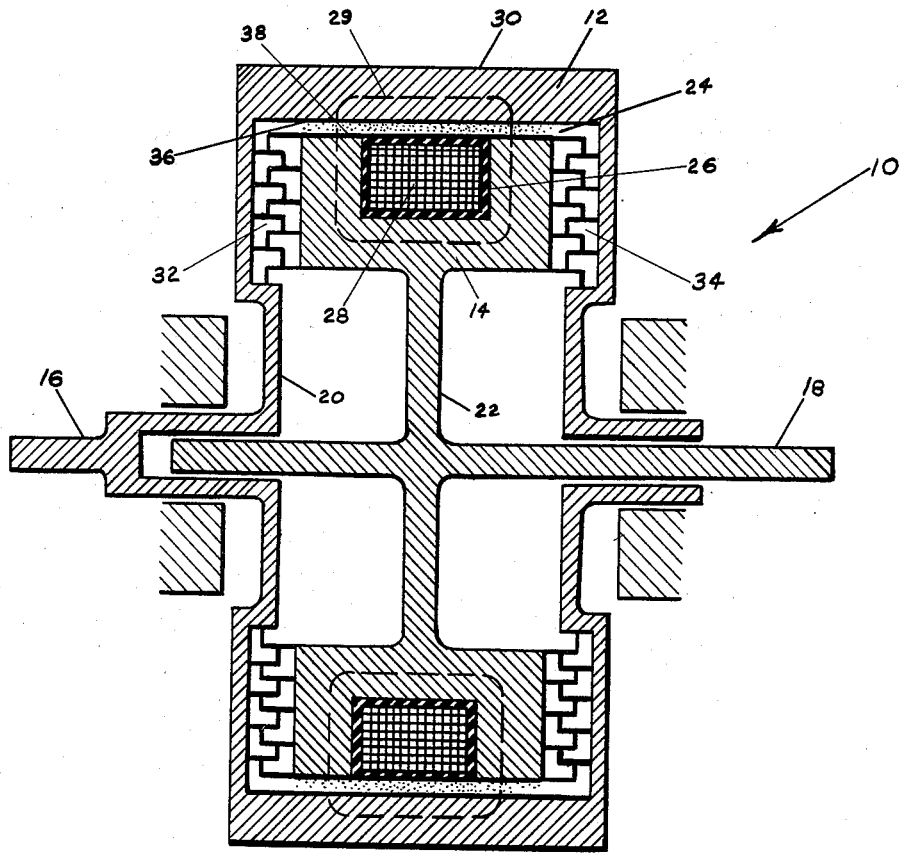
INVENTOR.
RALPH L. JAESCHKE
BY
ATTORNEYS

2,925,896

HARDENED SURFACES FOR MAGNETIC FLUID CLUTCHES

Ralph L. Jaeschke, Kenosha, Wis., assignor to Eaton Manufacturing Company, Cleveland, Ohio, a corporation of Ohio Application November 8, 1954, Serial No. 467,530

7 Claims. (Cl. 192—21.5)

This application is a continuation in part of application Serial No. 451,790, filed August 24, 1954, by Ralph L. Jaeschke, now abandoned.

The present invention relates to an electromagnetic apparatus employing magnetic couplings. More particularly, the present invention relates to an apparatus having a pair of relatively movable members with an air gap between them permeated with a coupling enhancing ingredient in the form of a magnetic powder or material comprising a magnetic pulverulent and an additive. The present invention will be described with reference to a clutch, it being understood that the principles involved apply equally to electromagnetic brakes, dynamometers, and the like apparatus.

Broadly, the invention comprehends the provision of a pair of coupling members for a clutch, brake, dynamometer, or the like apparatus employing magnetic powder or material, being formed, treated, coated, shielded or prepared in any suitable manner as to provide the areas thereof, that are exposed to and contacted by magnetic powder with a surface that is not susceptible to chemical reaction or physical alteration due to the presence of any elements in its environment, by virtue of the non-corrosive and/or hard, impervious and wear-resistant properties of its composition.

In the past, it has been experienced that in a clutch apparatus having a pair of relatively movable members separated to form an air gap and to receive a magnetic powder in the space between the members, an undesirable incrustation or scale would form on the surfaces of said members that are exposed to the magnetic powder and that contact them while the clutch is in operation. As such, under heavy duty operation for an extended period of time, wherein the temperature of the clutch members rises considerably, the incrustation or scale develops in such proportions as to very adversely affect the performance of the clutch and under the most severe circumstances to collect in such quantities as to jam or lock the clutch members together so tightly as to require dismantling of the apparatus to clear the gap and render the clutch operable again. Under less severe conditions, the production of scale due to wear causes the air gap to increase in dimensions so as to increase the reluctance of the magnetic path and consequently to reduce output torque and hence efficiency of the clutch. It has been determined that the presence of the scale may be accounted for by the oxidation of fine particles of metal worn away from the clutch members by the abrasive effect of the magnetic fluid and from the oxidation of the surfaces from which the particles are worn. Iron oxides, of which virtually non-magnetic ferric oxide ($Fe_2O_3$) is formed in greatest relative abundance and increase the reluctance of the magnetic path.

It is an object of the present invention, therefore, to provide an electromagnetic clutch or the like apparatus that may be idle for indefinite periods or may be operable for indefinite periods under heavy loads, without the formation of any objectionable incrustation, rust or scale on the apparatus members exposed to magnetic fluid.

It is another object of the present invention to provide an electromagnetic clutch or the like apparatus employing magnetic powder having the surfaces of the clutch members thereof, that are exposed to magnetic powder, hardened to a greater degree than the particles of the magnetic powder.

It is another object of the present invention to provide an electromagnetic clutch or the like apparatus employing magnetic powder having the surfaces thereof, that are exposed to magnetic powder, coated with a material harder than the members and the particles of magnetic powder.

It is another object of the present invention to provide an electromagnetic clutch or the like apparatus employing magnetic powder having the surfaces thereof, that are exposed to magnetic powder, shielded with a material harder than the members and the particles of magnetic powder.

It is another object of the present invention to provide an electromagnetic clutch or the like apparatus employing magnetic powder having the surfaces thereof, that are exposed to magnetic powder, case hardened to a greater degree than the main body of the members and the particles of magnetic fluid.

It is another object of the present invention to provide an electromagnetic clutch or the like apparatus employing magnetic powder, having the surfaces of the clutch members, that are exposed to magnetic powder, conditioned to provide a surface that is non-corrosive under typical conditions of operation.

It is another object of the invention to provide an electromagnetic clutch or the like apparatus employing magnetic powder, having surfaces of the clutch members thereof that are exposed to magnetic powder, conditioned to provide either a surface harder than the patricles of the magnetic powder and/or a surface that is non-corrosive such that even when worn by the abrasion of magnetic powders, it will not be oxidized to form a scale or incrustation on the operating surfaces of the clutch.

Other objects and advantages of the present invention will become apparent from a perusal of the following detailed description taken in connection with the accompanying drawing in which:

The single figure depicts in axial section a magnetic clutch or the like apparatus incorporating the present invention. In the operation of electromagnetic apparatus similar to the apparatus in the present invention, magnetic powder is caused to contact the surfaces of moving members of the apparatus. Surfaces of members, particularly those whose hardness is no greater than that of the particles of the magnetic powder, are consequently caused to wear and produce a fine ferrous powder which, due to exposure to air and humidity, oxidizes and forms a flaky incrustation or scale on the surfaces of the apparatus members. In one phase of the present invention, the surfaces of the apparatus members are rendered substantially impervious to the abrasive magnetic powder particles by some suitable means as, for example, surface coating, case hardening, or shielding. In accordance with a preferred embodiment of this phase of the invention, the surfaces are coated with a metal which, in its solid state, is considerably harder than the particles of magnetic powder. It has been determined that there are various suitable metals for the purpose including stainless steels, steel containing 5 to 18% chromium or nickel and molybdenum when the particles of magnetic powder are made of iron or steel. Molybdenum is a preferable surface conditioner since it is harder than iron or steel or any of the additives in the magnetic powder, it is not subject to any perceptible wear, and the formation of scale is effectively avoided. Alternatively, this phase of the present invention may be practiced by case hardening the surfaces of the members of the apparatus in any well-known manner to such a degree that the surface is harder than the particles of the magnetic powder so as to prevent any wear thereby to avoid the formation of scale. Still another alternative embodiment of this phase of the present invention may be practiced by covering the surfaces of the apparatus members with an abrasive resistant shield formed of material that is considerably harder than the particles of magnetic fluid.

In each of these embodiments of the invention it is, of course, important that in the practice of the present invention the usual operation of the electromagnetic apparatus is not disturbed. Therefore, in the use of nonmagnetic surface coats the same are maintained at a minimum thickness so as to minimize the effect on the magnetic circuit of the apparatus. It has been found that for practical purposes the thickness of the molybdenum coat employed may be so small as to cause little disturbance in the magnetic circuit and to require virtually no more magnetomotive force to produce the flux in the circuit than required without the coating.

In an alternative phase of the present invention, the surfaces of the clutch members may be conditioned with a suitable non-corrosive metal so that said surfaces inhibit the formation of undersirable oxides, and other scales thereon. Minute particles worn from said surfaces due to the abrasive effect of particles of magnetic powder engageable therewith, also being non-oxidizable and non-corrosive, merely becomes a part of the magnetic powder as an ingredient of the mixture thereof and only inconsequentially increase the mass of magnetic powder without necessarily proportionately increasing the magnetic permeability thereof. It is clear that by the selection of a suitable metal that is both equally magnetic with the powder particles and non-corrosive so that particles worn from the surface and becoming a part of the general mass of powder do not detract from the magnetic properties of the powder to any extent. This may be accomplished, for example, by the use of identical metals for the clutch members and the powdered material.

In one embodiment of this phase of the invention, the clutch members are an alloy composed of steel and another metal rendering the allow non-corrosive. Particles of the alloy worn away by the abrasion of the magnetic powder in clutch opeartion merely become a part of the magnetic powder without causing any adverse effects. In another embodiment, a suitable metal such as nickel is allowed with iron to comprise the clutch members. Particles of the clutch members worn away by abrasion become a part of the magnetic powder, but in this event, may be made of the same magnetic permeability as the powder.

Referring now to the drawing for a more detailed description of the present invention, 10 represents generally an electromagnetic clutch, brake, dynamometer or the like apparatus having a pair of relatively rotatable annular input and output members 12 and 14 mounted respectively on input and output shafts 16 and 18 through a casing 20 and a spider member 22. It is to be understood that the shafts 16 and 18 are interchangeable in function, that is, either may be the input or output as in a clutch apparatus and that either may be a stationary or oscillatable element as in a brake or dynamometer apparatus. Members 12 and 14 are separated by an air gap 24 and output member 14 is recessed at 26 to receive an annular coil 28 for producing a circulating magnetic field 29. Disposed in air gap 24 between input and output members 12 and 14 is a magnetic fluid 30 responsive to the flux circulated by coil 28 to assume the space of the gap of highest flux density. Labyrinth seals 32 and 34 are provided for preventing escape of magnetic fluid 30 from between members 12 and 14.

According to one phase of the present invention, the inner surface 36 of input member 12 and the outer surface 38 of output member 14 are conditioned in any suitable manner to present a relatively hard surface to the patricles of magnetic fluid 30. The radial thickness of the hardened portion is preferably very small, it being necessary only to prevent any initial wear by abrasion of the magnetic fluid without materially increasing reluctance to the magnetic field. As an example, a moylbdenum spray coating of a thickness from .003 inch to .005 inch was found ample to produce very satisfactory results. Thicknesses of a case hardened surface or of a shield added to the surface of the same order of magnitude as the molybdenum spray have also been found satisfactory for the purpose stated, but molybdenum spray coating has been found most satisfactory because it is cheap and least affects the magnetic circuit of the apparatus.

According to another phase of this invention, the input and output members 12 and 14 are made of a steel alloy that is non-corrosive when exposed to atmosphere under normal conditions or at elevated temperatures encountered in the operation of the clutch. Suitable constituents of the alloy other than steel may be such as to render the alloy harder or softer than the particles of magnetic powder, it being necessary only that the alloy be noncorrosive.

It is, of course, to be understood that in carrying out the present invention either or both of the clutch members may be conditioned to be non-corrosive in the manner described or either or both may be conditioned to provide a harder surface than the particles of magnetic material.

In carrying out the present invention, it has been found that various materials or mixes of magnetic powder or material such as, stainless steel, pure iron, or carbonyl iron are suitable for use either with or without lubricant and/or with other additives.

It is, of course, to be understood that the areas of the respective clutch members may be hardened in any suitable way and with any suitable material and that the members may be conditioned in any suitable way with any suitable material to provide a non-oxidizing, non-corrosive surface without departing from the scope and spirit of the present invention, it being a feature of this invention to provide a surface exposed to magnetic powder that is not susceptible to scaling or corrosion.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In a magnetic coupling comprising relatively rotatable input and output members separated to form a gap, magnetic material located in said gap, said input and output members having surfaces exposed to said magnetic material, at least the said surfaces of both of said members being metallic and non-corrosive under normal conditions and under all operating conditions of said coupling to prevent formation of scale from particles worn from said members, at least the said surfaces of said members comprising a non-corrosive alloy of iron and nickel with the nickel content being in the range of from 5 to 18% of the alloy.

2. In a magnetic coupling comprising relatively rotatable input and output members separated to form a gap therebetween, magnetic powdered material located in said gap, at least the surfaces of both of said members exposed to said powdered material being stainless steel, providing a hard, wear-resistant surface to particles of said powdered material to prevent formation of oxides or scales between said members.

3. In a magnetic coupling comprising relatively rotatable input and output members, separated to form a gap therebetween, magnetic material located in said gap, one of said members having a case-hardened metallic surface, exposed to said magnetic material, of a hardness greater than the hardness of the particles of said magnetic material, and the other of said members having a metallic coating on a surface thereof, exposed to said magnetic material of a hardness greater than the hardness of the particles of said magnetic material.

4. In a magnetic coupling comprising relatively rotatable input and output members, each of said members having a surface, said surfaces defining a gap, magnetic material located in said gap, said surfaces of said members being non-magnetic, metallic and harder than said material.

5. In a magnetic coupling comprising relatively movable input and output members, each of said members having a surface, said surfaces being opposed to each other to define a gap, magnetic material in said gap, means providing a magnetic field linking said members, said opposed surfaces of said members being metallic and of greater hardness than said material to inhibit abrasion and wear thereof, at least one of said opposed surfaces being case hardened.

6. In a magnetic coupling comprising an input member and an output member, spaced from the input member by a gap and being rotatable relative thereto, means producing a magnetic field linking said members, a magnetic material located between said members in said gap and a molybdenum coating on surfaces of said members exposed to said material, said molybdenum being harder than the particles of said material.

7. In a magnetic coupling comprising an input member and an output member spaced from said input member by a gap and being rotatable relative thereto, means producing a magnetic field linking said members, a magnetic material located in said gap and a molybdenum coating of a thickness less than .005 inch on adjacent, opposed surfaces of said members to provide a harder abrasive-resistant surface than said material.

References Cited in the file of this patent

UNITED STATES PATENTS

| | | |
|---|---|---|
| 1,519,417 | Payne | Dec. 16, 1924 |
| 2,631,705 | Winther | Mar. 17, 1953 |
| 2,718,157 | Schaub | Sept. 20, 1955 |
| 2,733,792 | Saxl | Feb. 7, 1956 |
| 2,809,731 | Rau | Oct. 15, 1957 |
| 2,851,136 | Sussebach et al. | Sept. 6, 1958 |

FOREIGN PATENTS

| | | |
|---|---|---|
| 1,045,030 | France | June 24, 1953 |
| 739,588 | Great Britain | Nov. 2, 1955 |

OTHER REFERENCES

Engineering Report #27, Design Investigation of Magnetic Particle Clutch, Servo-Mechanisms Laboratory, Massachusetts Institute of Technology, Cambridge 39, Mass.

Characteristics of Some Magnetic Fluid Clutch Servo Mechanisms, 20 pages published December 1949, AIEE Technical Paper, 50–24.

UNITED STATES PATENT OFFICE

CERTIFICATE OF CORRECTION

Patent No. 2,925,896 February 23, 1960

Ralph L. Jaeschke

It is hereby certified that error appears in the printed specification of the above numbered patent requiring correction and that the said Letters Patent should read as corrected below.

Column 3, line 46, for "allow" read -- alloy --; line 48, for "opeartion" read -- operation --; line 51, for "allowed" read -- alloyed --; column 4, lines 9 and 10, for "moylbdenum" read -- molybdenum --.

Signed and sealed this 16th day of August 1960.

(SEAL)
Attest:
KARL H. AXLINE
Attesting Officer

ROBERT C. WATSON
Commissioner of Patents